(12) United States Patent
Wang et al.

(10) Patent No.: US 12,026,325 B2
(45) Date of Patent: Jul. 2, 2024

(54) HANDHELD INPUT DEVICES WITH SLEEVES

(71) Applicant: Apple Inc., Cupertino, CA (US)

(72) Inventors: Paul X Wang, Cupertino, CA (US); Ray L Chang, Saratoga, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/351,415

(22) Filed: Jul. 12, 2023

(65) Prior Publication Data

US 2024/0061520 A1 Feb. 22, 2024

Related U.S. Application Data

(60) Provisional application No. 63/398,776, filed on Aug. 17, 2022.

(51) Int. Cl.
*G06F 3/0354* (2013.01)
*G06F 3/01* (2006.01)
*G06F 3/038* (2013.01)

(52) U.S. Cl.
CPC .......... *G06F 3/03545* (2013.01); *G06F 3/011* (2013.01); *G06F 3/03542* (2013.01); *G06F 3/0386* (2013.01)

(58) Field of Classification Search
CPC ...... G06F 3/013; G06F 3/03545; G06F 3/011; G06F 3/017; G06F 3/03542; G06F 3/016; G06F 3/0304; G06F 3/0386; G06F 2203/0381
See application file for complete search history.

(56) References Cited

U.S. PATENT DOCUMENTS

| | | | |
|---|---|---|---|
| 10,146,335 B2 | 12/2018 | Balan et al. | |
| 10,147,243 B2 | 12/2018 | Yamamoto et al. | |
| 10,198,092 B2 * | 2/2019 | Park | G06F 3/046 |
| 10,922,583 B2 | 2/2021 | Kaehler et al. | |
| 10,948,980 B2 * | 3/2021 | Wang | G06F 3/014 |
| 11,112,932 B2 | 9/2021 | Powderly et al. | |
| 11,150,777 B2 | 10/2021 | Kaehler et al. | |
| 11,275,455 B2 * | 3/2022 | Wang | G06F 3/03547 |
| 11,714,451 B2 * | 8/2023 | Lee | G06F 1/169 |
| | | | 361/679.01 |
| 11,853,484 B2 * | 12/2023 | Arai | H05K 1/181 |
| 11,853,489 B2 * | 12/2023 | Horie | G06F 3/04162 |

(Continued)

*Primary Examiner* — Vinh T Lam
(74) *Attorney, Agent, or Firm* — Treyz Law Group, P.C.; Kendall P. Woodruff

(57) ABSTRACT

A system may include an electronic device such as a head-mounted device and a handheld input device for controlling the electronic device. The handheld input device may include a stylus and a removable sleeve on the stylus. The input-output capabilities of the handheld input device may be shared between the stylus and the removable sleeve. The stylus may include touch sensor circuitry, a force-sensitive tip, and a motion sensor. The sleeve may include conductors for translating touch input on the sleeve to the touch sensor circuitry on the stylus, a deformable member for translating forces on the sleeve to the force-sensitive tip of the stylus, and visual markers that can be detected by an external camera and used with motion sensor data from the stylus to track the handheld input device. The removable sleeve may include haptic output devices and a battery and may be attached to an item without electronics.

20 Claims, 10 Drawing Sheets

(56) References Cited

U.S. PATENT DOCUMENTS

| | | | |
|---|---|---|---|
| 11,886,650 B2 * | 1/2024 | Poore | G02B 27/017 |
| 11,893,171 B2 * | 2/2024 | Wang | G06F 3/038 |
| 11,954,270 B2 * | 4/2024 | Kang | H02J 7/00 |
| 2014/0247235 A1 * | 9/2014 | Lee | A45C 15/00 |
| | | | 345/173 |
| 2014/0253469 A1 * | 9/2014 | Hicks | G06F 3/03545 |
| | | | 345/173 |
| 2022/0413628 A1 | 12/2022 | Lohse et al. | |
| 2024/0069352 A1 * | 2/2024 | Wang | H02J 7/0044 |

* cited by examiner

HANDHELD INPUT DEVICES WITH SLEEVES

This application claims the benefit of provisional patent application No. 63/398,776, filed Aug. 17, 2022, which is hereby incorporated by reference herein in its entirety.

FIELD

This relates generally to computer systems and, more particularly, to input devices for computer systems.

BACKGROUND

Electronic devices such as computers can be controlled using computer mice and other input accessories. Some devices, such as tablet computers, have touch-sensitive displays. An input device such as a computer stylus may be used to interact with a touch-sensitive display. For example, a user of a stylus may draw on the display. In virtual reality systems, force-feedback gloves can be used to control virtual objects. Cellular telephones may have touch screen displays and vibrators that are used to create haptic feedback in response to touch input.

Devices such as these may not be convenient for a user, may be cumbersome or uncomfortable, or may provide inadequate feedback.

SUMMARY

A system may include an electronic device such as a head-mounted device and a handheld input device for controlling the electronic device. The head-mounted device or other device may have a display configured to display virtual content that is overlaid onto real-world content.

The handheld input device may include a stylus and a removable sleeve on the stylus. The input-output capabilities of the handheld input device may be shared between the stylus and the removable sleeve. The stylus may include touch sensor circuitry, a force-sensitive tip, and a motion sensor. The sleeve may include conductors for translating touch input on the sleeve to the touch sensor circuitry on the stylus, a deformable member for translating forces on the sleeve to the force-sensitive tip of the stylus, and visual markers that can be detected by an external camera and used with motion sensor data from the stylus to track the handheld input device. The removable sleeve may include haptic output devices and a battery and may be attached to an item without electronics.

DETAILED DESCRIPTION

Figure 1:
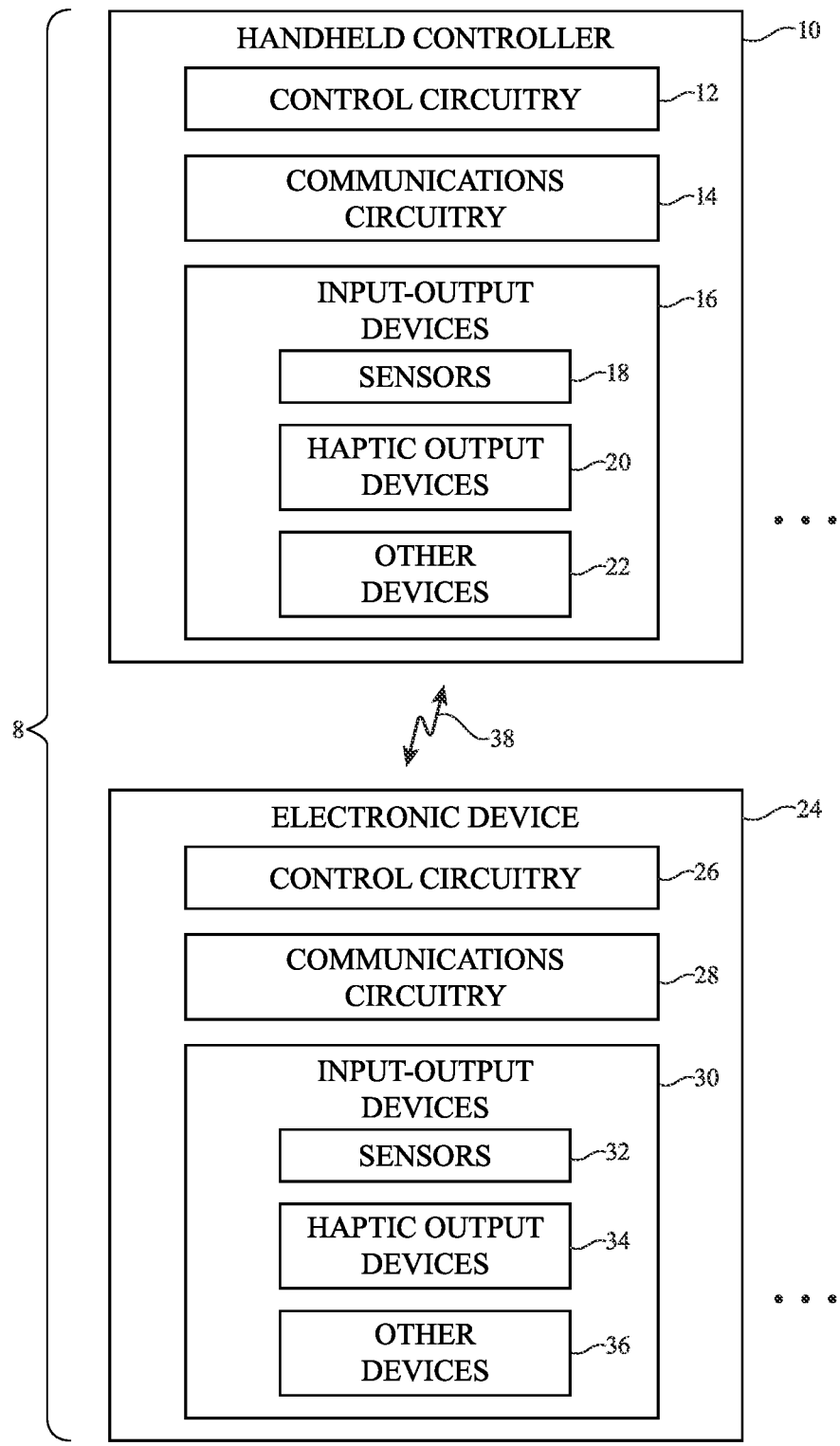
FIG. 1 is a schematic diagram of an illustrative system with a handheld input device in accordance with an embodiment.

Electronic devices that are configured to be held in the hand of a user may be used to gather user input and to provide a user with output. For example, electronic devices that are configured to control one or more other electronic devices, which are sometimes referred to as controllers, handheld controllers, input devices, or handheld input devices, may be used to gather user input and to supply output. A handheld input device may, as an example, include an inertial measurement unit with an accelerometer for gathering information on input device motions such as swiping motions, waving motions, writing movements, drawing movements, shaking motions, rotations, etc., and may include wireless communications circuitry for communicating with external equipment such as a head-mounted device, may include tracking features such as active or passive visual markers that can be tracked with an optical sensor in an external electronic device, may include input devices such as touch sensors, force sensors, buttons, knobs, wheels, etc., may include sensors for gathering information on the interactions between the handheld input device, the user's hands interacting with the input device, and the surrounding environment. The handheld input device may include a haptic output device to provide the user's hands with haptic output and may include other output components such as one or more speakers.

One or more handheld input devices may gather user input from a user. The user may use the handheld input devices to control a virtual reality or mixed reality device (e.g., head-mounted equipment such as glasses, goggles, a helmet, or other device with a display). During operation, the handheld input device may gather user input such as information on interactions between the handheld input device(s) and the surrounding environment, interactions between a user's fingers or hands and the surrounding environment, and interactions associated with virtual content displayed for a user. The user input may be used in controlling visual output on a display (e.g., a head-mounted display, a computer display, etc.). Corresponding haptic output may be provided to the user's fingers using the handheld input device. Haptic output may be used, for example, to provide the fingers of a user with a desired sensation (e.g., texture, weight, torque, pushing, pulling, etc.) as the user interacts with real or virtual objects using the handheld input device. Haptic output can also be used to create detents, to provide localized or global haptic feedback in response to user input that is supplied to the handheld input device, and/or to provide other haptic effects.

Handheld input devices can be held in one or both of a user's hands. Users can use the handheld input devices to interact with any suitable electronic equipment. For example, a user may use one or more handheld input devices to interact with a virtual reality or mixed reality system (e.g., a head-mounted device with a display), to supply input to a desktop computer, tablet computer, cellular telephone, watch, ear buds, or other accessory, to control household items such as lighting, televisions, thermostats, appliances, etc., or to interact with other electronic equipment.

A sleeve may be used to convert items into handheld input devices and/or to enhance the input-output capabilities of other input devices. The sleeve may include input-output components, sensors, and/or other circuitry and may be configured to wrap around an item that may or may not contain any electronics or circuitry. In some arrangements, the sleeve may wrap around an item without electronics such as a pen, a pencil, a paint brush, an eating utensil, or other handheld item. When the sleeve is placed on the item, the user can use the item normally (e.g., by writing with the pen or pencil, eating with the eating utensil, and/or performing other tasks with the item), while the sleeve provides input-output capabilities by tracking the motion of the item, sensing information about the environment, providing haptic feedback, etc. In some arrangements, the sleeve may wrap around an electronic device such as a stylus or other input device. With this type of arrangement, the sleeve may enhance the existing input-output capabilities of the stylus, and the stylus may enhance the input-output capabilities of the sleeve. When the sleeve is located on the stylus, the sleeve and stylus may form a combined handheld input device (e.g., for a head-mounted device or other electronic device) with both the input-output capabilities of the sleeve as well as the input-output capabilities of the stylus. When the sleeve is removed from the stylus, the stylus may be used normally (e.g., by providing input to a touch screen). This allows the user to easily switch between electronic devices using a single input device.

FIG. 1 is a schematic diagram of an illustrative system of the type that may include one or more handheld input devices. As shown in FIG. 1, system 8 may include electronic device(s) such as handheld input device(s) 10 and other electronic device(s) 24. Each handheld input device 10 may be held in the hand of a user. Additional electronic devices in system 8 such as devices 24 may include devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, device 10 is a handheld input device having an elongated marker-shaped housing configured to be grasped within a user's fingers or a housing with other shapes configured to rest in a user's hand, and device(s) 24 is a head-mounted device, cellular telephone, tablet computer, laptop computer, wristwatch device, a device with a speaker, or other electronic device (e.g., a device with a display, audio components, and/or other output components). A handheld input device with a marker-shaped housing may have an elongated housing that spans across the width of a user's hand and that can be held like a pen, pencil, marker, wand, or tool.

Devices 10 and 24 may include control circuitry 12 and 26. Control circuitry 12 and 26 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or 28 may include antennas, radio-frequency transceiver circuitry, and other wireless communications circuitry and/or wired communications circuitry. Circuitry 14 and/or 28, which may sometimes be referred to as control circuitry and/or control and communications circuitry, may, for example, support bidirectional wireless communications between devices 10 and 24 over wireless link 38 (e.g., a wireless local area network link, a near-field communications link, or other suitable wired or wireless communications link (e.g., a Bluetooth® link, a WiFi® link, a 60 GHz link or other millimeter wave link, etc.). Devices 10 and 24 may also include power circuits for transmitting and/or receiving wired and/or wireless power and may include batteries. In configurations in which wireless power transfer is supported between devices 10 and 24, in-band wireless communications may be supported using inductive power transfer coils (as an example).

Devices 10 and 24 may include input-output devices such as devices 16 and 30. Input-output devices 16 and/or 30 may be used in gathering user input, in gathering information on the environment surrounding the user, and/or in providing a user with output. Devices 16 may include sensors 18 and devices 30 may include sensors 32. Sensors 18 and/or 32 may include force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors (e.g., ultrasonic sensors for tracking device orientation and location and/or for detecting user input such as finger input), and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG) for detecting finger actions, radio-frequency sensors, depth sensors (e.g., structured light sensors and/or depth sensors based on stereo imaging devices), optical sensors such as self-mixing interferometric sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, and/or other sensors. In some arrangements, devices 10 and/or 24 may use sensors 18 and/or 32 and/or other input-output devices 16 and/or 30 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.). If desired, device 10 and/or device 24 may include rotating buttons (e.g., a crown mechanism on a watch or other suitable rotary button that rotates and that optionally can be depressed to select items of interest). Alphanumeric keys and/or other buttons may be included in devices 16 and/or 30. In some configurations, sensors 18 may include joysticks, roller balls, optical sensors (e.g., lasers that emit light and image sensors that track motion by monitoring and analyzing changings in the speckle patterns and other information associated with surfaces illuminated with the emitted light as device 10 is moved relative to those surfaces), fingerprint sensors, and/or other sensing circuitry. Radio-frequency tracking devices may be included in sensors 18 to detect location, orientation, and/or range. Beacons (e.g., radio-frequency beacons) may be used to emit radio-frequency signals at different locations in a user's environment (e.g., at one or more registered locations in a user's home or office). Radio-frequency beacon signals can be analyzed by devices 10 and/or 24 to help determine the location and position of devices 10 and/or 24 relative to the beacons. If desired, devices 10 and/or 24 may include beacons. Frequency strength (received signal strength information), beacon orientation, time-of-flight information, and/or other radio-frequency information may be used in determining orientation and position information. At some frequencies (e.g., lower frequencies such as frequencies below 10 GHz), signal strength information may be used, whereas at other frequencies (e.g., higher frequencies such as frequencies above 10 GHz), indoor radar schemes may be used). If desired, light-based beacons, ultrasonic beacons, and/or other beacon devices may be used in system 8 in addition to or instead of using radio-frequency beacons and/or radio-frequency radar technology.

Devices 16 and/or 30 may include haptic output devices 20 and/or 34. Haptic output devices 20 and/or 34 can produce motion that is sensed by the user (e.g., through the user's fingertips). Haptic output devices 20 and/or 34 may include actuators such as electromagnetic actuators, motors, piezoelectric actuators, electroactive polymer actuators, vibrators, linear actuators (e.g., linear resonant actuators), rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24). In some situations, actuators for creating forces in device 10 may be used in applying a sensation on a user's fingers (e.g., a sensation of weight, texture, pulling, pushing, torque, etc.) and/or otherwise directly interacting with a user's fingers. In other situations, these components may be used to interact with each other (e.g., by creating a dynamically adjustable electromagnetic repulsion and/or attraction force between a pair of devices 10 and/or between device(s) 10 and device(s) 24 using electromagnets).

If desired, input-output devices 16 and/or 30 may include other devices 22 and/or 36 such as displays (e.g., in device 24 to display images for a user), status indicator lights (e.g., a light-emitting diode in device 10 and/or 24 that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may also include power transmitting and/or receiving circuits configured to transmit and/or receive wired and/or wireless power signals.

Figure 2:
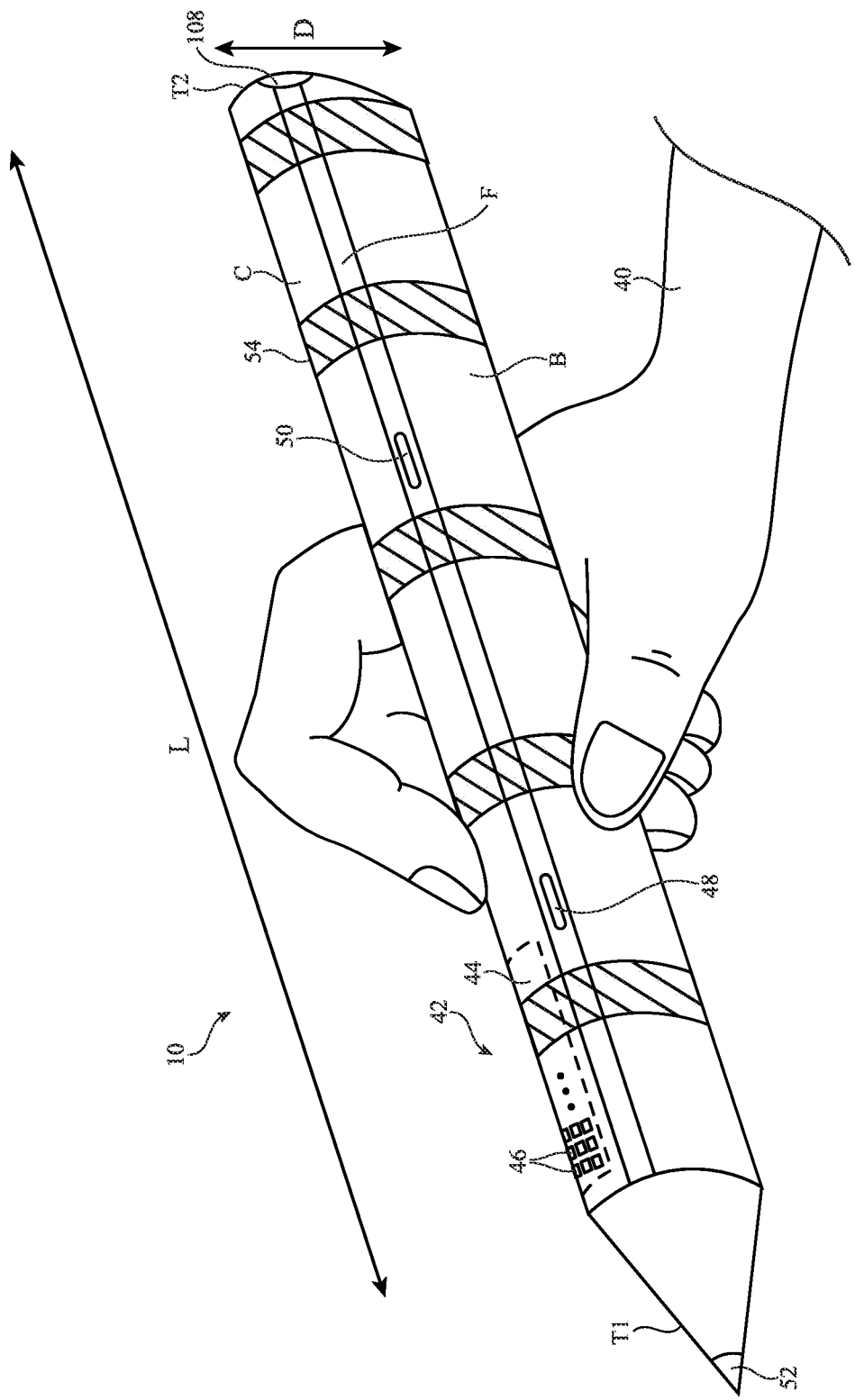
FIG. 2 is a perspective view of an illustrative handheld input device in accordance with an embodiment.

FIG. 2 is a perspective view of a user's hands (hands 40) and an illustrative handheld input device 10 (sometimes referred to as a handheld controller). As shown in FIG. 2, input device 10 may be an elongated marker-shaped electronic device that fits within the user's hand 40. The elongated shape of input device 10 allows hand 40 to hold input device 10 as if it were a pen, pencil, marker, or other writing implement. In other configurations, input device 10 may be held in hand 40 as a wand or baton would be held. In general, input device 10 may be held in hand 40 in any suitable manner (e.g., at the end, in the middle, between two, three, four, or all five fingers, with both hands, etc.).

A user may hold one or more of devices 10 simultaneously. For example, a user may hold a single one of devices 10 in the user's left or right hand. As another example, a user may hold a first device 10 in the user's left hand and a second device 10 in the user's right hand. Arrangements in which multiple devices 10 are held in one hand may also be used.

Configurations in which devices 10 have bodies that are held within a user's hands are sometimes described herein as an example.

Control circuitry 12 (and, if desired, communications circuitry 14 and/or input-output devices 16) may be contained entirely within device 10 (e.g., in housing 54) and/or may include circuitry that is located in an external structure (e.g., in an external electronic device such as device 24, a console, a storage case, etc.).

In general, electrical components such as control circuitry 12, communications circuitry 14, and/or input-output devices 16 (e.g., sensors 18, haptic output devices 20, and/or other devices 22) may be mounted within and/or on the surface(s) of input device housing 54 in any suitable locations.

As shown in FIG. 2, housing 54 may have an elongated marker shape, elongated tube shape, elongated cylindrical shape, and/or any other elongated shape. Housing 54 which may sometimes be referred to as an enclosure, body, or case, may be formed of plastic, glass, ceramics, fiber composites, metal (e.g., stainless steel, aluminum, etc.), fabric, other suitable materials, or a combination of any two or more of these materials. Housing 54 may be formed using a unibody configuration in which some or all of housing 54 is machined or molded as a single structure or may be formed using multiple structures (e.g., an internal frame structure, one or more structures that form exterior housing surfaces, etc.). Housing 54 may form outer housing walls, tip portions, and/or internal support structures for device 10. Housing 54 may have a length L between 140 mm and 150 mm, between 130 mm and 160 mm, between 100 mm and 200 mm, between 120 mm and 160 mm, greater than 180 mm, less than 180 mm, or any other suitable length. The diameter D of housing 54 may be between 12 mm and 14 mm, between 10 mm and 15 mm, between 11 mm and 16 mm, between 15 mm and 20 mm, between 18 mm and 25 mm, greater than 25 mm, less than 25 mm, or any other suitable diameter.

Housing 54 may have one or more curved surfaces and one or more planar surfaces. In the illustrative example of FIG. 2, device 10 has a curved surface C that wraps around a first portion of device 10 and a flat surface F that extends along a second portion of device 10. If desired, flat surface F may be located on a first side of device 10 and curved surface C may be located on a second opposing side of device 10. Curved surface C and flat surface F wrap around device 10 to form an elongated tube shape that surrounds an elongated interior space for housing internal components such as control circuitry 12, communications circuitry 14, and input-output devices 16. Housing 54 may have an elongated shaft portion such as shaft B extending between first and second tip portions such as tip portion T1 at a first end of device 10 and tip portion T2 at a second opposing end of device 10. One or both of housing tip portions T1 and T2 may be removable from the main elongated shaft B between tip portions T1 and T2.

Ultrasonic sensors, optical sensors, inertial measurement units, touch sensors such as capacitive touch sensor electrodes, strain gauges and other force sensors, radio-frequency sensors, and/or other sensors may be used in gathering sensor measurements indicative of the activities of device 10 and/or hand 40 holding device 10.

In some configurations, input device position, movement, and orientation may be monitored using sensors that are mounted in external electronic equipment (e.g., in a computer or other desktop device, in a head-mounted device or other wearable device, and/or in other electronic device 24 that is separate from device 10). For example, optical sensors such as images sensors that are separate from device 10 may be used in monitoring device 10 to determine their position, movement, and/or orientation. If desired, devices 10 may include passive and/or active optical registration features to assist an image sensor in device 24 in tracking the position, orientation, and/or motion of device 10. For example, devices 10 may include light-emitting devices. The light-emitting devices may include light-emitting diodes, lasers (e.g., laser diodes, vertical cavity surface-emitting lasers, etc.), or other light sources and may operate at visible wavelengths, ultraviolet wavelengths, and/or infrared wavelengths. The light-emitting devices may be arranged in an asymmetric pattern on housing 54 and may emit light that is detected by an image sensor, depth sensor, and/or other light-based tracking sensor circuitry in device 24 (e.g., a head-mounted device, desktop computer, stand-alone camera-based monitoring systems, and/or other electrical equipment with an image sensor or other tracking sensor circuitry). By processing the received patterned of emitted light, device 24 can determine the position, orientation, and/or motion of device 10. If desired, the light-emitting devices can be removable and/or customizable (e.g., a user can customize the location and type of light-emitting devices).

Tracking can also be performed that involves extrapolating from a known body part orientation (e.g., a finger orientation) to produce orientation information on other body parts (e.g., wrist and/or arm orientation estimated using inverse kinematics). Visual odometry sensors may, if desired, be included in devices 10. These sensors may include image sensors that gather frames of image data of the surroundings of devices 10 and may be used in measuring position, orientation, and/or motion from the frame of image data. Lidar, ultrasonic sensors oriented in multiple directions, radio-frequency tracking sensors, and/or other input device tracking arrangements may be used, if desired.

In some arrangements, user input for controlling system 8 can include both user input to input device 10 and other user input (e.g., user eye gaze input, user voice input, etc.). For example, gaze tracking information such as a user's point-of-gaze measured with a gaze tracker can be fused with input to input device 10 when controlling device 10 and/or devices 24 in system 8. A user may, for example, gaze at an object of interest while device 10 uses one or more of sensors 18 (e.g., an accelerometer, force sensor, touch sensor, etc.) to gather information such as tap input (tap input in which a user taps on device 10 with one or more fingers, tap input in which device 10 taps a table top or other external surface or object, and/or any other tap input resulting in measurable forces and/or accelerometer output from device 10), double-tap input, force input, input device gestures (tapping, swiping, twirling, shaking, writing, drawing, painting, sculpting, gaming, and/or other gestures with device 10, gestures on external surfaces with device 10, gestures on external objects with device 10, gestures interacting with virtual objects, gestures with input device 10 in the air, etc.), drag and drop operations associated with objects selected using a lingering gaze or other point-of-gaze input, etc. The input from input device 10 to system 8 may include information on finger orientation, position, and/or motion relative to input device 10, may include information on how forcefully a finger is pressing against surfaces of input device 10 (e.g., force information), may include information on how forcefully input device 10 is pressed against an object or external surface (e.g., how forcefully a tip portion such as tip portion T1 presses against an external surface), may include pointing input (e.g., the direction in which input device 10 is pointing), which may be gathered using radio-frequency sensors among sensors 18 and/or other sensors in device(s) 10, and/or may include other input.

By correlating user input from a first of devices 10 with user input from a second of devices 10 and/or by otherwise analyzing sensor input, multi-device input may be detected and used in manipulating virtual objects or taking other actions in system 8. Consider, as an example, the use of a tap gesture with device 10 to select a virtual object associated with a user's current point-of-gaze. Once the virtual object has been selected based on the direction of the user's point-of-gaze (or pointing direction input) and based on the tap gesture input or other user input, further user input gathered with one or more devices 10 may be used to rotate and/or otherwise manipulate the virtual object. For example, information on input device movement (e.g., rotational movement) may be gathered using an internal measurement unit or other sensor 18 in device(s) 10 and this rotational input may be used to rotate the selected object. In some scenarios, an object may be selected based on point-of-gaze (e.g., when a user's point-of-gaze is detected as being directed toward the object) and, following selection, object attributes (e.g., virtual object attributes such as virtual object appearance and/or real-world object attributes such as the operating settings of a real-world device) can be adjusted using strain gauge input, touch sensor input, input device orientation input (e.g., to rotate a virtual object, etc.).

If desired, gestures such as air gestures (three-dimensional gestures) with device 10 may involve additional input. For example, a user may control system 8 using hybrid gestures that involve movement of device(s) 10 through the air (e.g., an air gesture component) and that also involve contact between device 10 and one or more fingers of hand 40. As an example, an inertial measurement unit in device 10 and/or a camera in device 24 may detect user movement of device 10 through the air (e.g., to trace out a path) while a sensor 18 in device 10 such as a two-dimensional touch sensor, a force sensor, or other sensor 18 detects force input, touch input, or other input associated with contact to device 10.

The sensors in device 10 may, for example, measure how forcefully a user is moving device 10 against a surface (e.g., in a direction perpendicular to the surface) and/or how forcefully a user is moving device 10 along a surface (e.g., shear force in a direction parallel to the surface). The direction of movement of device 10 can also be measured by the force sensors and/or other sensors 18 in device 10.

Information gathered using sensors 18 such as force sensor input gathered with a force sensor, motion data gathered with a motion sensor (e.g., pointing input, rotations, etc.), location information indicating the location of input device 10, touch input gathered with a touch sensor, and other user input may be used to control external equipment such as device 24. For example, control circuitry 12 may send control signals to device 24 that include instructions to select a user interface element, instructions to scroll display content, instructions to select a different input function for input device 10 (e.g., to switch from using input device 10 as a drawing or writing implement to using input device 10 as a pointing device or game piece), instructions to draw a line or type a word on a display in device 24, instructions to adjust operational settings of device 24, instructions to manipulate display content on device 24, and/or instructions to take any other suitable action with device 24. These control signals may be sent in addition to or instead of providing feedback to sensor input from device 10 (e.g., haptic output, audio output, adjusting operational settings of device 10, etc.).

In the illustrative configuration of FIG. 2, device 10 includes touch sensor 42. Touch sensor 42 may be formed from an array of capacitive touch sensor electrodes such as electrodes 46 overlapping one or more surfaces of housing 54 such as curved surface C, flat surface F, and/or surfaces on tip portions T1 and T2. Touch sensor 42 may be configured to detect swipes, taps, multitouch input, squeeze input, and/or other touch input. In some arrangements, touch sensor 42 is formed from a one-dimensional or two dimensional array of capacitive electrodes 46. In some arrangements, touch sensor 42 may be a strain gauge that detects squeeze input to housing 54 (e.g., when a user squeezes or pinches device 10 between the user's fingers). Touch sensor 42 may be used to gather touch input such as input from direct contact and/or close proximity with a different finger of the user or other external object. In the example of FIG. 2, touch sensor 42 overlaps touch input area 44 on curved surface C of device 10. If desired, additional touch input may be gathered in adjacent areas such as flat surface F of housing 54. If desired, touch sensor 42 may include other types of touch sensing technologies such as optical touch sensors, acoustic-based touch sensors, etc. Touch sensor 42 may span the length L of device 10, may span only partially along length L of device 10, may cover some or all of curved surface C, may cover some or all of flat surface F, and/or may cover some or all of tip portions T1 and T2. If desired, touch sensor 42 may be illuminated, may overlap a display (e.g., to form a touch-sensitive display region on device 10), may overlap an indicator or textured surface, and/or may otherwise be visually or tangibly distinct from the surrounding non-touch-sensitive portions of housing 54 (if desired).

In addition to or instead of touch sensor 42, device 10 may include one or more other user input devices such as user input device 48. User input device 48 may be a mechanical input device such as a pressable button, a rotating knob, a rotating wheel, a rocker switch, a slider, or other mechanical input device, a force sensor such as a strain gauge or other force sensor, an optical sensor such as a proximity sensor, a touch sensor such as a capacitive, acoustic, or optical touch sensor, and/or any other suitable input device for receiving input from a user's hand 40. If desired, one of haptic output devices 20 such as an actuator may be used to provide haptic feedback in response to user input to device 48. For example, input device 48 may be a touch-sensitive button that does not physically move relative to housing 54, but the user may feel a localized button click sensation from haptic output that is provided from an actuator 20 overlapping device 48.

In addition to or instead of touch sensor 42 and input device 48, device 10 may include one or more sensors at tip portions T1 and T2. For example, tip portion T1 and/or tip portion T2 may be force-sensitive. As shown in FIG. 2, device 10 may include sensor 52. Sensor 52 may be located at one or both of tip portions T1 and T2 and/or may be located elsewhere in device 10 such as at a location along shaft B of device 10. Shaft B, which may sometimes be referred to as a cylindrical housing, may form an elongated main body portion of housing 54 of device 10 that extends between tip T1 and tip T2. One or more of tip portions T1 and T2 may be removable and may sometimes be referred to as a cap, a writing tip, etc. Sensors at tip portions T1 and T2 such as sensor 52 may include a device position sensor (e.g., an optical flow sensor having a light source that illuminates a portion of a surface that is contacted by device 10 and having an image sensor configured to determine a location of device 10 on the surface and/or to measure movement of the electronic device relative to the surface based on captured images of the illuminated portion, a mechanical position sensor such as an encoded wheel that tracks movements of device 10 on the surface, or other device position sensor), a force sensor (e.g., one or more strain gauges, piezoelectric force sensors, capacitive force sensors, and/or any other suitable force sensor), an optical proximity sensor such a light-emitting diode and light detector, a camera (e.g., a one-pixel camera or an in image sensor with a two-dimensional array of pixels), and/or other sensor.

Device 10 may circuitry for receiving wired and/or wireless power. For example, wired power may be conveyed to device 10 through a charging port such as charging port 108, and wireless power may be conveyed to device 10 through capacitively coupled contacts and/or a inductive charging coil such as coil 50. If desired, device 10 may only receive wired power and coil 50 may be omitted. In other arrangements, device 10 may only receive wireless power and charging port 108 may be omitted (or port 108 may serve as a data port, audio port, or other suitable port). In arrangements where device 10 includes circuitry for receiving wireless power, power can be conveyed wirelessly between device 10 and an external electronic device such as device 24 (e.g., a head-mounted device, a wireless charging mat, a storage case, a battery case, a wireless charging puck, or other electronic device). As an example, contacts (e.g., metal pads) may be capacitively coupled (without forming ohmic contact) to allow power to be transferred and/or power can be conveyed using a wireless power transmitter with a coil in device 24 to transmit wireless power signals to a wireless power receiver with a coil in device 10. Inductive power transfer techniques may be used (e.g., wireless power can be transmitted using one or more wireless power transmitting coils in device 24 and transmitted wireless power signals can be received in a power receiving circuit in device 10 using a power receiving coil such as coil 50). Received alternating-current wireless power signals from device 24 can be converted to direct-current power using a rectifier in device 10 for charging a battery in device 10 and/or for powering circuitry in device 10. In configurations in which the power receiving circuit of device 10 receives power via a wired connection (e.g., using terminals), the power receiving circuit in device 10 may provide the received power to a battery and/or other circuitry in device 10.

To help align wireless charging coil 50 in device 10 with a wireless charging coil in device 24 and/or to otherwise hold device 10 to a power source or other device (e.g., device 24 of FIG. 1), device 10 and device 24 may be provided with mating alignment features (e.g., mating protrusions and recesses and/or other interlocking alignment structures (e.g., key and keyhole structures that allow device 10 and/or device 24 to interlock when engaged by twisting or other locking motions), magnets (or ferromagnetic elements such as iron bars), and/or other alignment structures.

In configurations in which device 10 includes magnetic attachment structures (e.g., magnets, magnetic material that is attracted to magnets, or other magnetic attachment structures), device 10 may be held against the interior and/or exterior of device 24 using the magnetic attachment structures. For example, device 24 may be a battery case with a groove or other recess that receives device 10. Magnetic attachment structures in device 24 (e.g., near the groove) and in device 10 may corporate (magnetically attached) to help secure device 10 within the interior of the case (e.g., without allowing device 10 to rattle excessively inside the case). As another example, device 24 may be a head-mounted device (e.g., goggles and/or glasses) or a strap or other wearable device. In this type of arrangement, magnetic attachment structures may hold device 10 against an exterior surface of device 24 (e.g., against a portion of the housing of a pair of goggles or glasses such as along the frame of a pair of glasses, to the front, top, or side surface of a pair of goggles, etc.) or within a recess in the housing of device 24. Magnets and other alignment features may be located near coil 50 or may be located in other portions of housing 54.

In some arrangements, handheld input device 10 may be a stand-alone input device with all of the input-output components of input device 10 formed in a common housing. In other arrangements, the input-output capabilities of handheld input device 10 may be shared between a removable sleeve and an input device such as a stylus. This allows the sleeve to convert a stylus into a handheld input device (e.g., of the type shown in FIG. 2) for interacting with an electronic device such as a head-mounted device (e.g., by providing the stylus with visual tracking features, haptic output devices, additional battery, one or more visual indicators, etc.). When the sleeve is removed from the stylus, the stylus may be used normally (e.g., by providing input to a touch screen). If desired, the sleeve may be placed on other objects that do not have electronics or circuitry such as a pencil, pen, paint brush, eating utensil, or other item. This allows the sleeve to convert an everyday object into a handheld input device for interacting with an electronic device such as a head-mounted device.

Figure 3:
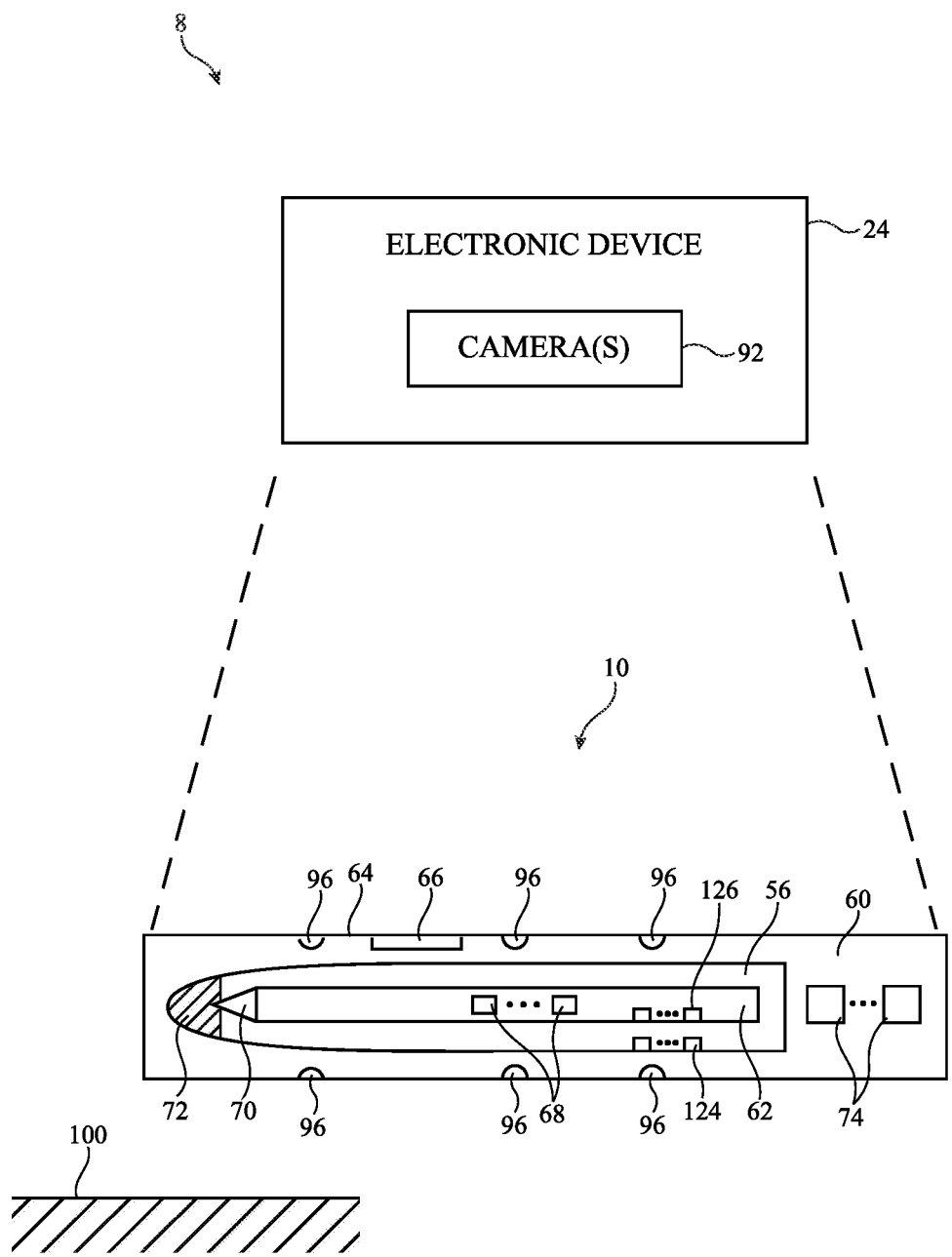
FIG. 3 is a diagram of an illustrative system including a handheld input device with a sleeve and an electronic device such as a head-mounted device in accordance with an embodiment.

FIG. 3 is a diagram of an illustrative system including a handheld input device 10 formed from a sleeve and a stylus. As shown in FIG. 3, device 10 may include a stylus such as stylus 62 and a removable sleeve such as sleeve 60 (sometimes referred to as a shell, cover, or case). Sleeve 60 may include a housing such as housing 64. Housing 64 may have an elongated marker shape, an elongated tube shape, an elongated cylindrical shape, and/or any other elongated shape. Housing 64, which may sometimes be referred to as an enclosure or case, may be formed of plastic, glass, ceramics, fiber composites, metal (e.g., stainless steel, aluminum, etc.), fabric, other suitable materials, or a combination of any two or more of these materials. Housing 64 may have an elongated central opening such as opening 56 that extends along a longitudinal axis of housing 64. Housing 64 may completely enclose opening 56, or opening 56 may extend through the walls of housing 64 to one or more outer surfaces of housing 64. Opening 56 may be configured to receive stylus 62. Sleeve 60 may be used to add weight and size to stylus 62, while also providing additional input-output capabilities to stylus 62. For example, stylus 62 may normally be used for providing input to a touch screen, but may not have sufficient size, weight, tracking capabilities, battery life, and/or other features to be used with other non-touch-screen devices such as a head-mounted device with a display. Sleeve 60 may provide these missing features to stylus 62 while also taking advantage of the existing input-output capabilities of stylus 62.

Stylus 62, which may sometimes be referred to as a digital pencil, electronic pen, stylus device, computer stylus, etc., may have an elongated housing that forms a computer stylus shaft or may have other suitable housing structures. Stylus 62 may be used to draw on a touch screen in a tablet computer. Stylus 62 may also be used to draw on drawing pad surfaces that do not contain displays. Stylus 62 may interact wirelessly with external equipment. For example, stylus 62 may use one or more electrodes located at tip 70 of stylus 62 to generate alternating-current (AC) electromagnetic signals that are detected by a capacitive touch sensor in a tablet computer (e.g., to determine the position of the tip of the device relative to the touch sensor) and may use a wireless local connection such as a Bluetooth® link or other wireless communications link to convey information between stylus 62 and the tablet computer. If desired, stylus 62 may have wireless power receiving circuitry that allows a battery in the computer stylus to be wirelessly charged (e.g., using inductive charging). Stylus 62 and sleeve 60 may communicate with each other wirelessly or through contacts such as contacts 124 of sleeve 60 and mating contacts 126 of stylus 62.

Stylus 62 may have some or all of the circuitry described in connection with device 10 of FIG. 1. In particular, as shown in FIG. 3, stylus 62 may include electrical components 68. Electrical components 68 may include control circuitry 12, communications circuitry 14, and some or all of input-output devices 16 such as sensors 18, haptic output devices 20, and other devices 22.

Sleeve 60 may include some or all of the circuitry described in connection with device 10 of FIG. 1. For example, sleeve 60 may include electrical components 74. Electrical components 74 may include control circuitry 12, communications circuitry 14, and some or all of input-output devices 16 such as sensors 18, haptic output devices 20, and other devices 22.

In some arrangements, the electrical components that are included in sleeve 60 may enhance the input-output capabilities of stylus 62 to form a combined handheld input device 10 with more capabilities than sleeve 60 or stylus 62 alone. For example, components 74 of sleeve 60 may include additional battery to help charge circuitry within sleeve 60 and stylus 62, a haptic output device such as an electromagnetic actuator to provide haptic output (e.g., haptic output in associated with display content being displayed by a head-mounted display that is controlled by device 10, haptic output in response to user input to device 10, etc.), a visual indicator to provide visual output, tracking features such as motion sensor circuitry and/or visual markers (e.g., infrared light-emitting diodes) so that device 10 can be tracked by an external camera in a head-mounted device, and/or other circuitry.

For example, stylus 62 may be free of haptic output devices, whereas components 74 of sleeve 60 may include a haptic output device (e.g., haptic output device 20 of FIG. 1) for providing haptic feedback. In other arrangements, stylus 62 may include a first haptic output device 20 and sleeve 60 may include a second haptic output device 20. The two haptic output devices may be different types of haptic output devices and/or may be configured to provide different types of haptic output. For example, haptic output devices in stylus 62 may be configured to provide relatively weak haptic feedback (e.g., haptic feedback suitable for providing input to a touch screen), whereas haptic output devices in sleeve 60 may be configured to provide stronger haptic feedback, directional haptic feedback, and/or other more complex haptic feedback (e.g., haptic feedback suitable for use with a head-mounted device). If desired, sleeve 60 may include haptic output devices for providing global haptic feedback as well as haptic output devices such as haptic output device 66 (e.g., an electromagnetic actuator or other haptic output device described in connection with devices 20 of FIG. 1) for providing localized haptic feedback.

Stylus 62 may also enhance the input-output capabilities of sleeve 60. For example, stylus 62 may include a force-sensitive tip such as force-sensitive tip 70. Sleeve 72 may include compliant structures such as compliant tip structure 72 (e.g., compliant polymer, foam, elastomeric silicone, or other deformable member) that couples to force-sensitive tip 70 when stylus 62 is received within sleeve 60. This allows forces (e.g., force input) on the tip of sleeve 60 to be translated to force-sensitive tip 70 through compliant structure 72.

Since stylus 62 is primarily used for providing input to touch screens, stylus 62 may not include any tracking features for helping external electronic devices track the location of stylus 62. Stylus 62 may include a motion sensor (e.g., an accelerometer, gyroscope, compass, etc.), but a motion sensor alone may be insufficient for a head-mounted device to be able to track the location of stylus 62. Sleeve 60 may include visual markers such as markers 96 for providing tracking capabilities to stylus 62. As shown in FIG. 3, external equipment such as electronic device 24 in system 8 may contain sensors such as one or more cameras 92 (e.g., visual light cameras, infrared cameras, etc.). Electronic device 24 may, as an example, be a head-mounted device such as augmented reality (mixed reality) or virtual reality goggles (or glasses, a helmet, or other head-mountable support structures). Visual markers such as markers 96 may be placed on sleeve 60 of device 10. Markers 96 may be, for example, passive visual markers such as bar codes, cross symbols, reflectors, or other visually identifiable patterns and may be applied to any suitable location of sleeve 60 of device 10. Markers 96 may, if desired, include active visual markers formed from light-emitting components (e.g., visual light-emitting diodes and/or infrared light-emitting diodes modulated using identifiable modulation codes) that are detected using cameras such as camera 92. Markers 96 may help inform system 8 of the location of input device 10 as a user is interacting with a computer or other equipment in system 8.

Visual markers 96 on sleeve 60 of device 10 and/or inertial measurement units such as an inertial measurement unit in sleeve 60 and/or stylus 62 may be used in tracking the location of input device 10 relative to device 24 and/or relative to an external object such as surface 100. At the same time, system 8 may display associated visual content for the user (e.g., using a display on device 24). The user may interact with the displayed visual content by supplying force input (e.g., to force sensitive tip of stylus 62 via compliant structure 72), motion input (e.g., air gestures, pointing gestures, rotations, etc.) detected by motion sensors in stylus 62 and/or sleeve 60, taps, shear force input, touch input, and other input to sleeve 60 and/or stylus 62 of device 10.

For example, information on the location of device 10 relative to device 24 and/or surface 100 may be gathered by control circuitry 12 in device 10 or by control circuitry 26 of device 24 (e.g., head-mounted device, a computer, cellular telephone, or other electronic device) during operation of system 8 while monitoring device 10 for force input, gesture input (e.g., taps, three-dimensional air gestures, pointing input, writing or drawing input, etc.), touch input, and/or any other user input indicating that a user has selected (e.g., highlighted), moved, or otherwise manipulated a displayed visual element and/or provided commands to system 8. As an example, a user may make an air gesture with device 10 such as waving device 10 to the left to move visual content to the left. System 8 may use an inertial measurement unit in device 10 to detect the left hand wave gesture and can move visual elements being presented to the user with a display in device 24 in response to the left hand wave gesture. As another example, a user may select a visual element in the user's field of view by tapping on that element with device 10 and/or pointing towards the element with device 10. A user may draw, paint, or otherwise move device 10 along surface 100 to form a corresponding drawing, painting, or other visual output on a display of device 24.

In this way, control circuitry 12 in device 10 and/or control circuitry 26 in device 24 may allow a user to manipulate visual elements being viewed by the user (e.g., virtual reality content or other visual content being presented with a head-mounted device such as augmented reality goggles or other device 24 with a display). If desired, a camera such as camera 92 may face the eyes of a user (e.g., camera 92 or other visual tracking equipment may form part of a gaze tracking system). The camera and/or other circuitry of the gaze tracking system may monitor the direction in which a user is viewing real-world objects and visual content. As an example, a camera may be used to monitor the point of gaze (direction of gaze) of a user's eyes as the user is interacting with virtual content presented by device 24 and as the user is holding input device 10 in hand 40. Control circuitry 12 in device 10 and/or control circuitry 26 in device 24 may measure the amount of time that a user's gaze dwells in particular locations and can use this point-of-gaze information in determining when to select virtual objects. Virtual objects can also be selected when it is determined that a user is viewing a particular object (e.g., by analyzing point-of-gaze information) and when it is determined that a user has made a voice command, finger input, button press input, or other user input to select the particular object that is being viewed. Point-of-gaze information can also be used during drag and drop operations (e.g., to move virtual objects in accordance with movement of the point-of-gaze from one location in a scene to another).

Figure 4:
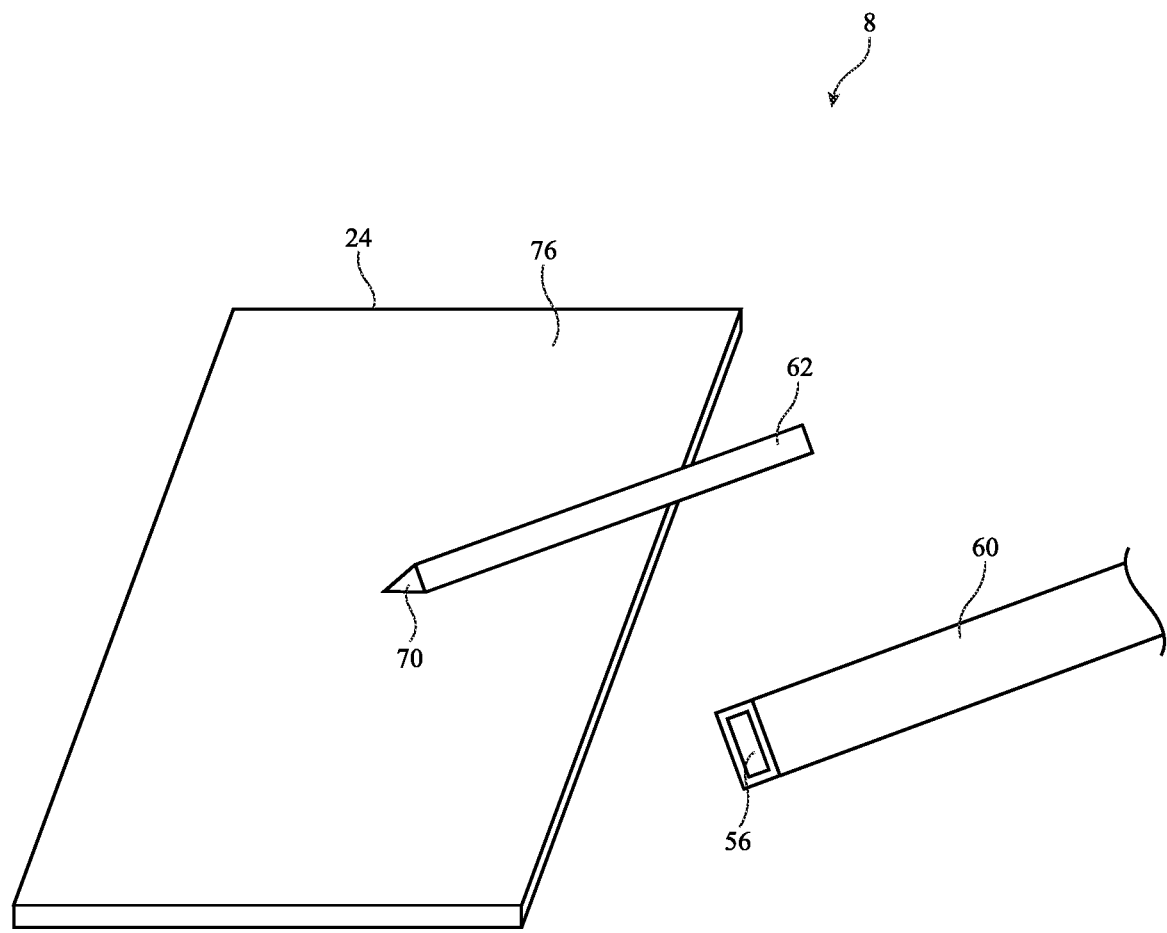
FIG. 4 is a perspective view of an illustrative system including a handheld input device from which a sleeve has been removed and an electronic device such as a tablet computer in accordance with an embodiment.

FIG. 4 is a perspective view of an illustrative system in which sleeve 60 has been removed from stylus 62. As shown in FIG. 4, stylus 62 may be removed from central opening 56 of sleeve 60. When sleeve 60 is removed from stylus 62, stylus 62 may be used to provide input to an electronic device such as electronic device 24. Electronic device 24 may, for example, be a device with a touch screen or touch pad such as a tablet computer, a cellular telephone, a laptop, or other electronic device. Electronic device 24 may include a display such as display 76. Display 76 of device 24 may be touch-sensitive. For example, display 76 may include a two-dimensional capacitive touch sensor array that overlaps an array of pixels configured to display an image. Electrodes at tip 70 of stylus 62 may emit electromagnetic signals that are detected by the touch sensor of display 76. This allows tip 70 to be used to draw on-screen items such as a line on screen 76 (e.g., using a drawing program or other software running on device 24). Signals from tip 70 may also be used to make menu selections, to manipulate visual content displayed on other devices in system 8, and/or may otherwise be used to provide computer stylus input to system 8. Stylus 62 may include wireless circuitry for communicating with corresponding wireless communications circuitry in device 24 (e.g., over a Bluetooth® link or other wireless link). Using this wireless link, stylus 62 may, for example, convey sensor measurements from stylus 62 to device 24 to control device 24 or may otherwise supply input to system 8.

If desired, stylus 62 may be used to provide input to display 76 without removing sleeve 60. For example, tip 70 may be exposed through an opening in sleeve 60, or sleeve 60 may have a removable portion that can be removed to expose tip 70 while keeping the rest of sleeve 60 on stylus 62. The example of FIG. 4 is merely illustrative.

In a first mode of operation, stylus 62 may be used to provide input to a head-mounted device such as device 24 of FIG. 3. In a second mode of operation, stylus 62 may provide input to a touch screen such as display 76 of device 24 of FIG. 4. If desired, stylus 62 and/or sleeve 60 may include presence sensors (e.g., proximity sensors, optical sensors, capacitive sensors, and/or other sensors) for detecting the presence of sleeve 60 on stylus 62. Control circuitry in stylus 62 may, if desired, automatically switch between the first and second modes of operation based on the sensor data indicating whether or not sleeve 60 is present on stylus 62.

Figure 5:
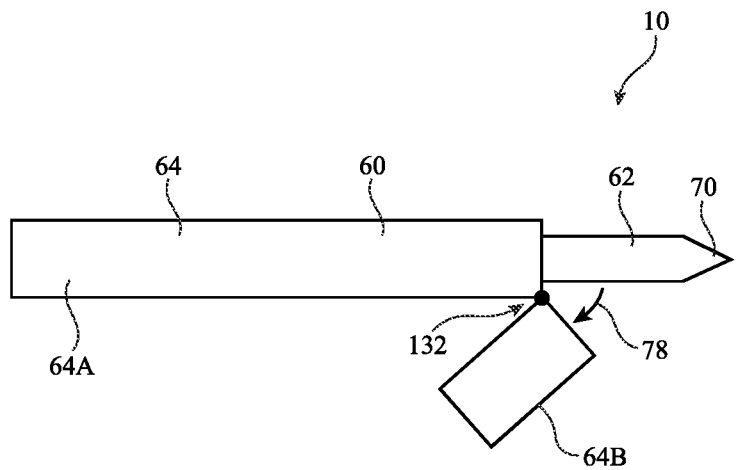
FIG. 5 is a side view of an illustrative handheld input device having a sleeve with a hinged cap in accordance with an embodiment.

FIG. 5 is a side view of handheld input device 10 showing how sleeve 60 may have hinged housing structures. As shown in FIG. 5, housing 64 of sleeve 60 may include first housing portion 64A and second housing portion 64B. First housing portion 64A may form a main housing portion that surrounds most of stylus 62 when stylus 62 is received within sleeve 60. Second housing portion 64B (sometimes referred to as a cap housing portion) may be coupled to first housing potion 64A via hinge 132. Hinge 132 may allow cap housing portion 64B to rotate open and closed relative to main housing portion 64A. If desired, stylus 62 may be contained entirely within main housing portion 64A or may have a portion such as tip portion 70 that extends into cap portion 64B when cap portion 64B is closed. When cap portion 64B is opened in direction 78, tip 70 may be exposed so that stylus 62 can be removed from sleeve 60 or so that input can be provided from tip 70 to a touch screen such as display 76 while stylus 62 is located in sleeve 60.

Figure 6:
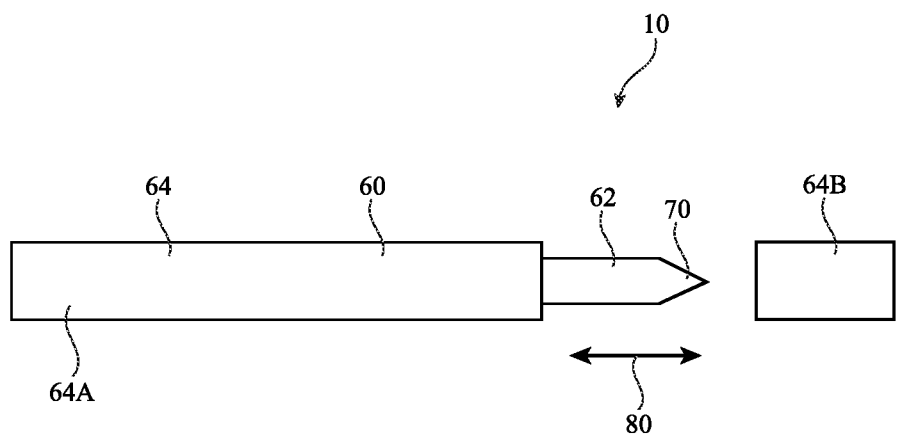
FIG. 6 is a side view of an illustrative handheld input device having a sleeve with a press-fit cap in accordance with an embodiment.

FIG. 6 is a side view of handheld input device 10 showing how sleeve 60 may have separable housing structures. As shown in FIG. 6, housing 64 of sleeve 60 may include first housing portion 64A and second housing portion 64B. First housing portion 64A may form a main housing portion that surrounds most of stylus 62 when stylus 62 is received within sleeve 60. Second housing portion 64B may be coupled to first housing potion 64A via a press fit connection (e.g., a friction fit). The press fit connection may allow cap housing portion 64B to be completely removed from main housing portion 64A. If desired, stylus 62 may be contained entirely within main housing portion 64A or may have a portion such as tip portion 70 that extends into cap portion 64B when cap portion 64B is closed. When cap portion 64B is removed from main housing portion 64A, tip 70 may be exposed so that stylus 62 can be removed from sleeve 60 or so that input can be provided from tip 70 to a touch screen such as display 76 while stylus 62 is located in sleeve 60.

Figure 7:
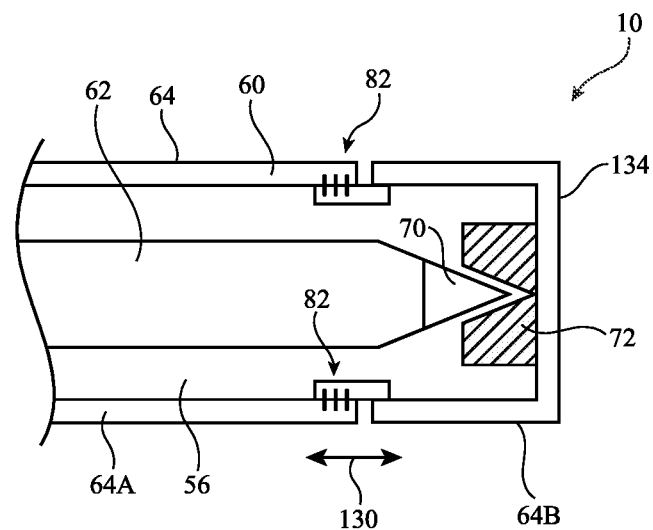
FIG. 7 is a side view of an illustrative handheld input device having a sleeve with a screw cap and a compliant tip coupling structure in accordance with an embodiment.

FIG. 7 is a side view of handheld input device 10 showing how sleeve 60 may have housing structures that screw together. As shown in FIG. 7, housing 64 of sleeve 60 may include first housing portion 64A and second housing portion 64B. First housing portion 64A may form a main housing portion that surrounds most of stylus 62 when stylus 62 is received within sleeve 60. Second housing portion 64B may be coupled to first housing potion 64A via mating screw threads 82. The screw connection may allow cap housing portion 64B to be completely removed from main housing portion 64A. If desired, stylus 62 may be contained entirely within main housing portion 64A or may have a portion such as tip portion 70 that extends into cap portion 64B when cap portion 64B is closed. When cap portion 64B is removed from main housing portion 64A, tip 70 may be exposed so that stylus 62 can be removed from sleeve 60 or so that input can be provided from tip 70 to a touch screen such as display 76 while stylus 62 is located in sleeve 60.

If desired, the joint where cap housing portion 64B screws on or otherwise attaches to main housing portion 64A may be a compliant joint that allows movement in directions 130 of cap housing portion 64B relative to main housing portion 64A. This allows forces (e.g., force input) on tip portion 134 of sleeve 60 to be translated through cap housing portion 64B to force-sensitive tip 70 of stylus 62.

Figure 8:
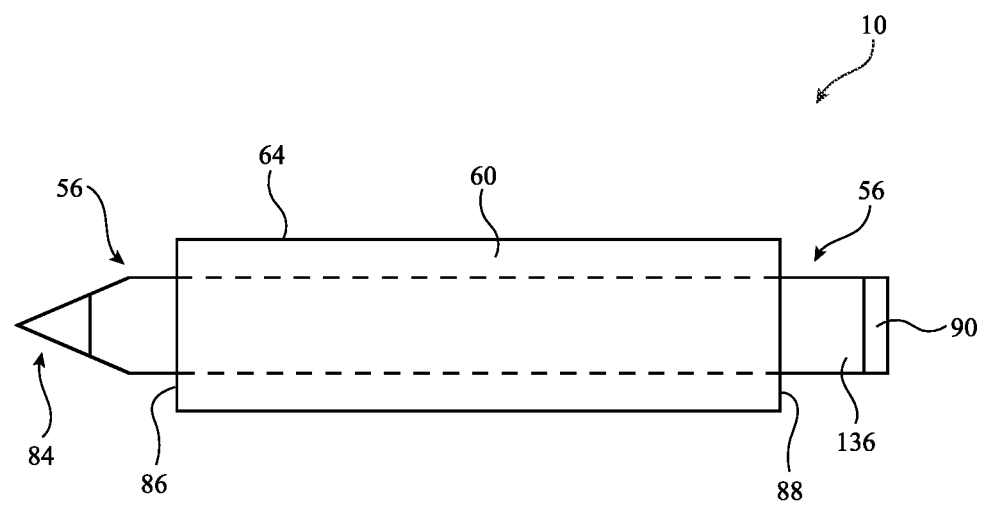
FIG. 8 is a side view of an illustrative handheld input device having a sleeve with two opposing open ends in accordance with an embodiment.

FIG. 8 is a side view of handheld input device 10 showing how sleeve 60 may have first and second open ends. As shown in FIG. 8, housing 64 of sleeve 60 includes first end 86 and second opposing end 88. Opening 56 may pass through housing 64 from first end 86 to second end 88. This allows the first and second opposing ends (e.g., tip 84 and end 90) of the item within sleeve 60 such as item 136 to be exposed on either end of sleeve 60.

Item 136 may be a computer stylus (e.g., stylus 62 of FIG. 3) or may be an item without electronics such as a pen, pencil, paint brush, or other writing utensil. Sleeve 60 may be placed on item 136 to convert item 136 into an input device for an external electronic device such as a head-mounted device, a computer, a laptop, a cellular telephone, a tablet computer, or other electronic device. Using the tracking capabilities of sleeve 60 (e.g., visual markers 96, a motion sensor, etc.), the external electronic device may track the motion of item 136 which in turn may be used as input to the external electronic device. For example, if a user is writing, drawing, or painting with tip 84 or erasing with an eraser on end 90 on an external surface, the external electronic device may use the tracking capabilities of sleeve 60 to display the writing, drawing, painting, or erasing from item 136 on a display. Haptic output devices in sleeve 60 may provide haptic output to a user's hands in response to motions or actions with item 136. In this way, sleeve 60 may be used to turn everyday objects into input devices or handheld controllers for external electronic devices.

Figure 9:
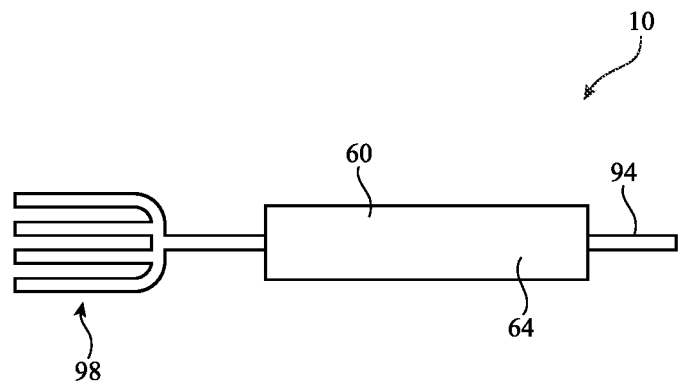
FIG. 9 is a side view of an illustrative handheld input device having a sleeve surrounding an item without electronics in accordance with an embodiment.

FIG. 9 shows an illustrative example in which sleeve 60 has been placed on the elongated shaft of an eating utensil such as a fork. As shown in FIG. 9, utensil 94 may include tip 98. Sleeve 60 may be placed on utensil 94 to track the movements of utensil 94 (e.g., to track a user's eating habits) and/or to convert utensil 94 into an input device for an external electronic device such as a head-mounted device, a computer, a laptop, a cellular telephone, a tablet computer, or other electronic device. Using the tracking capabilities of sleeve 60 (e.g., visual markers 96, a motion sensor, etc.), the external electronic device may track the motion of utensil 94 which in turn may be used as input to the external electronic device. For example, if a user is eating with utensil 94, the external electronic device may use the tracking capabilities of sleeve 60 to track and log the user's eating habits. Haptic output devices in sleeve 60 may provide haptic output to a user's hands in response to motions or actions with utensil 94.

Figure 10:
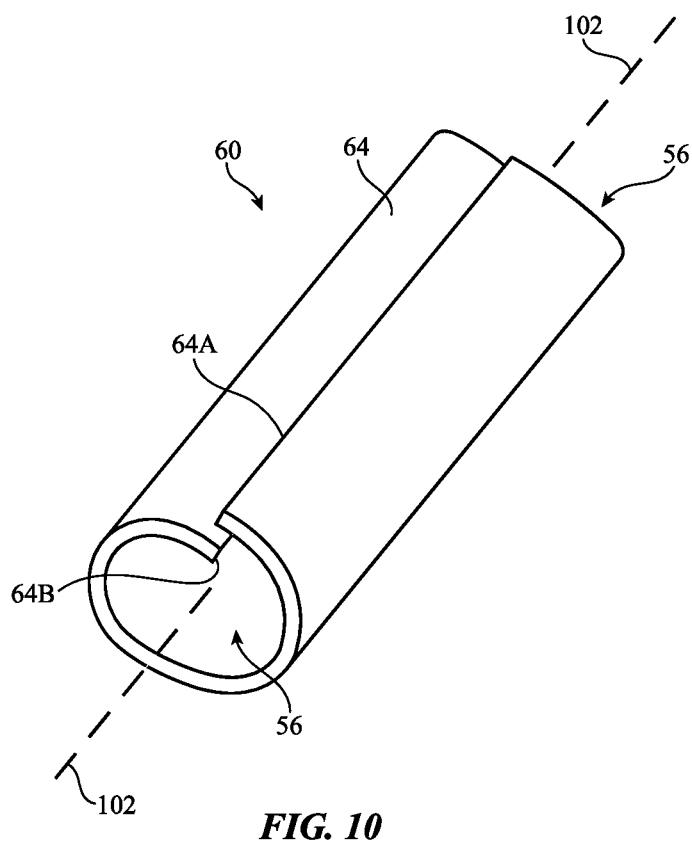
FIG. 10 is a perspective view of an illustrative sleeve formed from flexible materials that can be wrapped around an item in accordance with an embodiment.

FIG. 10 is a perspective view of sleeve 60 in an illustrative arrangement in which the housing of sleeve 60 is flexible. As shown in FIG. 10, housing 64 may be formed from a flexible material that can roll and unroll. When sleeve 60 is placed on an item such as stylus 62 (or item 136 of FIG. 8, utensil 94 of FIG. 9, etc.), the first and second opposing ends of housing 64 such as first end 64A and second end 64B may join together to form a hollow tube that surrounds a longitudinal axis such as longitudinal axis 102. Ends 64A and 64B may be coupled together using a lap joint, a butt joint, adhesive, clips, hook-and-loop fasteners, magnetic structures, and/or other attachment mechanisms. When it is desired to remove stylus 62 from opening 56 of sleeve 60, stylus 62 may be pulled out from one open end of sleeve 60, or sleeve 60 may be unrolled (e.g., partially unrolled or fully unrolled to a flat shape).

Figure 11:
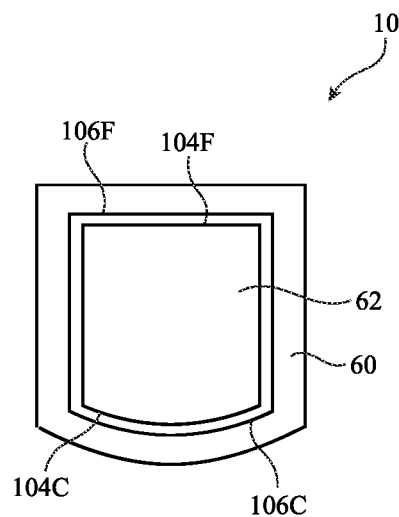
FIG. 11 is a cross-sectional view of an illustrative handheld input device having a stylus and a sleeve with mating surface features in accordance with an embodiment.

FIG. 11 is a cross-sectional side view of input device 10 showing how sleeve 60 and stylus 62 may have mating surfaces to help align and secure stylus 62 within sleeve 60. As shown in FIG. 11, sleeve 60 may have inner walls that define opening 56 such as planar inner wall 106F and curved inner wall 106C. Stylus 62 may have outer surfaces with one or more flat portions such as planar portion 104F and one or more curved portions such as curved portion 104C. Curved portion 104C of the outer surface of stylus 62 may have a convex shape that mates with (e.g., conforms to) the curved, concave inner wall 106C of sleeve 60. Planar portion 104F of the outer surface of stylus 62 may mate with planar inner wall 106F. This ensures that stylus 62 is locked in place within sleeve 60 (e.g., without rattling around or rotating within sleeve 60). This is merely illustrative. If desired, other alignment features such as magnets and/or interlocking engagement structures may be used to align and secure stylus 62 within sleeve 60.

Figure 12:
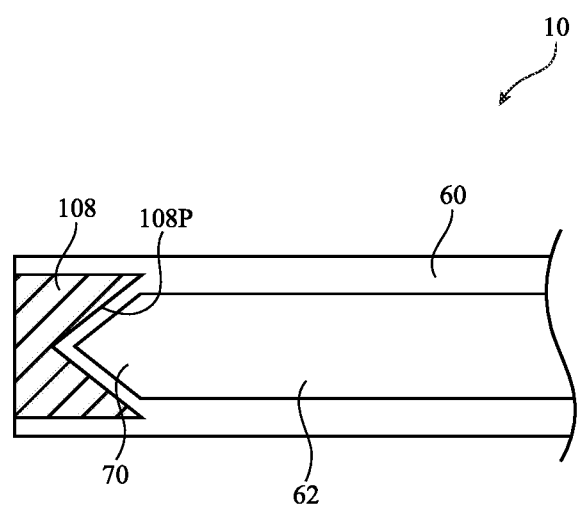
FIG. 12 is a side view of an illustrative handheld input device having a sleeve with a magnetic structure for receiving a stylus within the sleeve in accordance with an embodiment.

FIG. 12 shows an example in which magnetic structures are used to secure stylus 62 within sleeve 60. As shown in FIG. 12, sleeve 60 may include magnetic structure 108. Magnetic structure 108 may be formed form electromagnets, permanent magnets, structures formed from magnetic material (e.g., iron bars or other ferromagnetic members that are attracted to magnets such as electromagnets and/or permanent magnets), etc. Stylus 62 may include a magnetic structure that is attracted to magnetic structure 108. When stylus 62 is inserted into sleeve 60, the magnetic attraction between stylus 62 and magnetic structure 108 may pull stylus 62 all the way into sleeve 60 and snap stylus 62 into place. If desired, magnetic structure 108 may have a concave surface such as concave surface 108P (e.g., a cone-shaped recess) that receives tip 70 of stylus 62.

Figure 13:
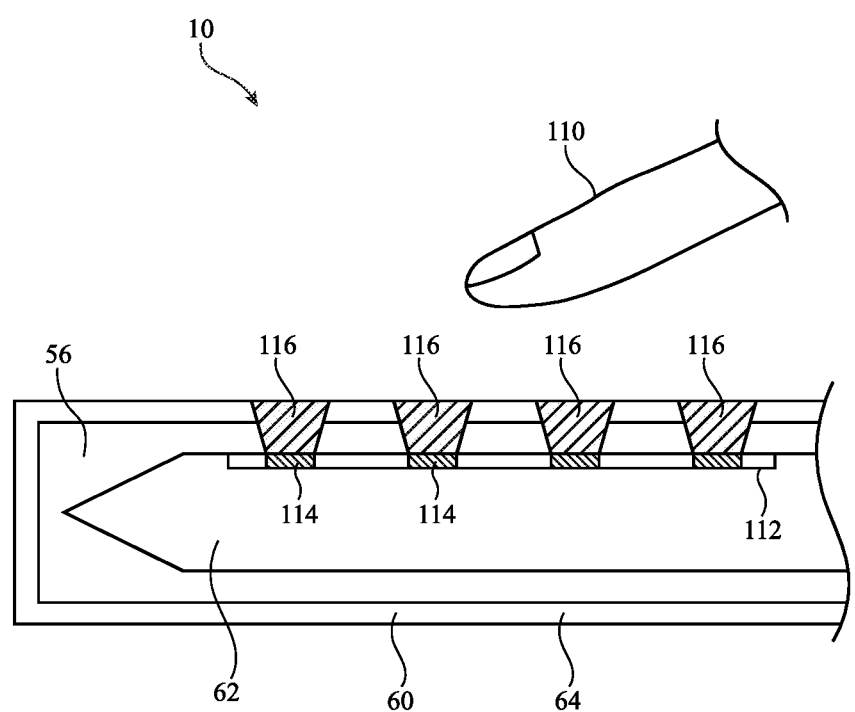
FIG. 13 is a side view of an illustrative handheld input device with touch sensor structures in accordance with an embodiment.

FIG. 13 is a side view of input device 10 showing how the touch sensing capabilities of stylus 62 may operate through sleeve 60. As shown in FIG. 13, stylus 62 may include a touch sensor such as touch sensor 112. Touch sensor 112 may include an array of touch sensor electrodes such as capacitive touch sensor electrodes 114. When sleeve 60 is not located on stylus 62, a user may provide touch input by touching stylus 62 on touch sensor 112.

When sleeve 60 is located on stylus 62, touch sensor 112 may be covered. Sleeve 60 may include structures that allow touch sensor 112 to gather finger input through sleeve 60. For example, as shown in FIG. 13, sleeve 60 may include an array of conductors 116. Conductors 116 may pass through housing 64 and may be respectively electrically coupled to touch sensor electrodes 114. Conductors 116 may serve as an extension of touch sensor electrodes 114 such that contact between a user's finger 110 and conductors 116 of sleeve 60 may be detected by touch sensor 112. This type of touch sensor may sometimes be referred to as a mutual capacitive touch sensor.

In other arrangements, conductors 116 may be omitted and replaced with an insulating portion of housing 64. This allows electrodes 114 to detect changes in capacitance through housing 64 resulting from a finger touching or hovering over sleeve 60. This type of touch sensor may sometimes be referred to as a self-capacitive touch sensor and may be used to detect finger hover input (e.g., where finger 110 is separated from touch sensor 112 by some distance).

Figure 14:
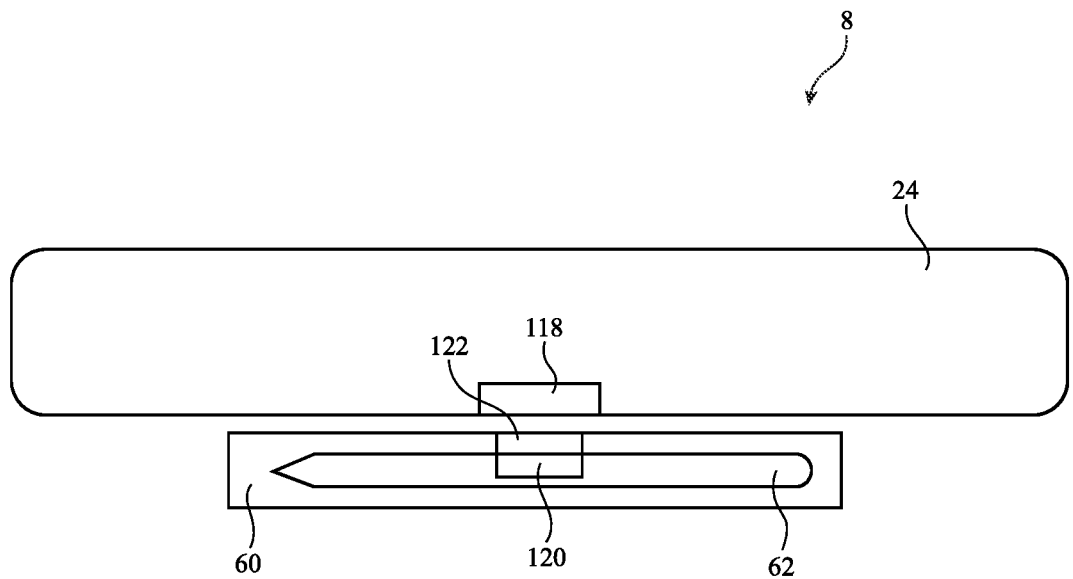
FIG. 14 is a side view of an illustrative system in which an electronic device is used to charge a handheld input device via charging circuitry in a sleeve of the handheld input device in accordance with an embodiment.
Figure 15:
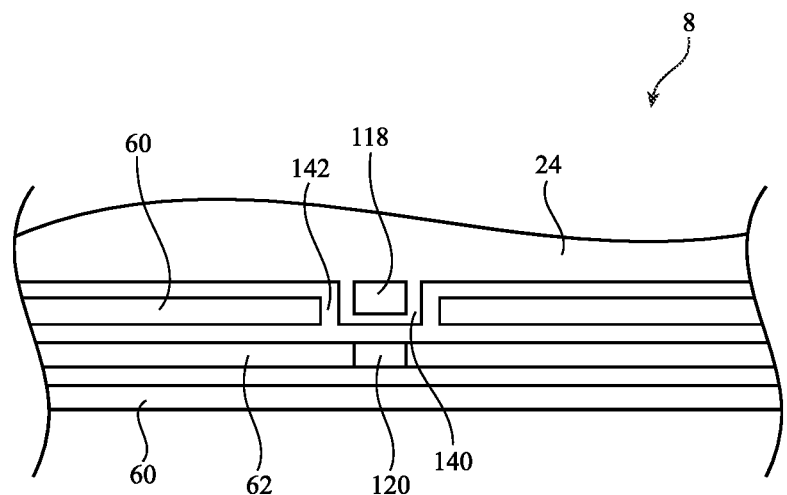
FIG. 15 is a side view of an illustrative system in which an electronic device is used to charge a handheld input device through an opening in a sleeve of the handheld input device in accordance with an embodiment.

FIGS. 14 and 15 show illustrative charging solutions for input device 10. As shown in FIG. 14, stylus 62 may include a power receiving coil such as power receiving coil 120. Power receiving coil 120 may be configured to receive wireless power from a power transmitting coil such as power transmitting coil 118 in electronic device 24 (e.g., a head-mounted device, a tablet computer, a laptop, etc.) through inductive power transfer techniques. Input device 10 may be attached to device 24 via magnets or other attachment mechanisms.

When sleeve 60 is located on stylus 62, coil 120 may be covered by sleeve 60. In order to transfer power from device 24 to stylus 62, sleeve 60 may include charging circuitry 122. Charging circuitry 122 may include a power receiving coil that receives power from power transmitting coil 118 and may include a power transmitting coil for transmitting the power to power receiving coil 120 of stylus 62. In other arrangements, charging circuitry 122 may include a power receiving coil that receives power from power transmitting coil 118 and may include a battery that stores the received power. Charging circuitry 122 may then convey power from the battery in sleeve 60 to circuitry in stylus 62 (e.g., via contacts 126 and 124 of FIG. 3).

In the example of FIG. 15, sleeve 60 includes an opening such as opening 142. Power transmitting coil 118 of device 24 may be located in protruding portion 140 of device 24 that protrudes into opening 142. Power receiving coil 120 of stylus 62 may be aligned with opening 142 of sleeve 60. This allows the power transmitting coil 118 of device 24 to provide wireless power directly to power receiving coil 120.

As described above, one aspect of the present technology is the gathering and use of information such as sensor information. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, eyeglasses prescription, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A sleeve configured to provide input to a head-mounted device having a camera, the sleeve comprising:
    a housing having an opening that is configured to receive a stylus; and
    visual markers on an outer surface of the housing with which the camera tracks a location of the sleeve.

2. The sleeve defined in claim 1 wherein the opening is fully enclosed within the housing.

3. The sleeve defined in claim 1 wherein the visual markers comprise infrared light-emitting diodes.

4. The sleeve defined in claim 1 further comprising a compliant member configured to translate forces to a force-sensitive tip of the stylus.

5. The sleeve defined in claim 1 wherein the housing comprises an insulating portion through which a touch sensor in the stylus gathers finger hover input.

6. The sleeve defined in claim 1 further comprising an array of conductors through which a touch sensor in the stylus gathers touch input.

7. The sleeve defined in claim 1 wherein the housing has interior walls with a curved portion and a planar portion that respectively mate with a curved surface and a planar surface of the stylus.

8. The sleeve defined in claim 1 further comprising first contacts configured to electrically couple to second contacts on the stylus.

9. The sleeve defined in claim 1 further comprising a magnetic structure that attracts the stylus.

10. The sleeve defined in claim 9 wherein the magnetic structure comprises a recess that mates with a tip of the stylus.

11. The sleeve defined in claim 1 further comprising a haptic output device and a battery.

12. A sleeve for an item having an elongated shaft, comprising:
    a housing having an opening configured to receive the elongated shaft;
    an actuator in the housing that is configured to provide haptic output;
    a battery in the housing; and
    infrared light-emitting diodes on the housing that are configured to emit infrared light.

13. The sleeve defined in claim 12 wherein the housing has first and second opposing ends and a longitudinal axis extending between the first and second ends, and wherein the opening extends along the longitudinal axis from the first end to the second end.

14. The sleeve defined in claim 12 wherein the housing comprises a main housing portion, a cap housing portion, and a hinge that couples the cap housing portion to the main housing portion.

15. The sleeve defined in claim 12 wherein the housing comprises a main housing portion and a cap housing portion that screws onto the main housing portion.

16. The sleeve defined in claim 12 wherein the housing comprises a main housing portion and a cap housing portion that attaches to the main housing portion via a press fit connection.

17. The sleeve defined in claim 12 wherein the housing comprises a flexible housing configured to roll and unroll.

18. A system, comprising:
    an electronic device having a power source; and
    a handheld input device that is configured to temporarily couple to the electronic device, the handheld input device comprising:
        a stylus having a power receiving coil; and
        a removable sleeve at least partially surrounding the stylus, wherein the power receiving coil is configured to receive wireless power from the power source through the removable sleeve.

19. The system defined in claim 18 wherein the removable sleeve comprises an opening and wherein the power receiving coil is configured to receive the wireless power from the power source through the opening.

20. The system defined in claim 18 wherein the removable sleeve comprises charging circuitry configured to convey the wireless power from the power source to the power receiving coil.

* * * * *